(12) United States Patent
Takeuchi (10) Patent No.: US 7,463,442 B2
(45) Date of Patent: Dec. 9, 2008

(54) IMPEDANCE-MATCHED WRITE DRIVER CIRCUIT AND SYSTEM USING SAME

(75) Inventor: Hiroshi Takeuchi, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 11/001,258

(22) Filed: Nov. 30, 2004

(65) Prior Publication Data
US 2005/0094306 A1    May 5, 2005

Related U.S. Application Data

(62) Division of application No. 10/404,531, filed on Mar. 31, 2003, now abandoned.

(51) Int. Cl.
*G11B 5/02* (2006.01)
(52) U.S. Cl. ....................................... 360/68
(58) Field of Classification Search ................ None
See application file for complete search history.

(56) References Cited

U.S. PATENT DOCUMENTS

| | | | |
|---|---|---|---|
| 5,357,379 A * | 10/1994 | Gower | 360/46 |
| 6,121,800 A * | 9/2000 | Leighton et al. | 327/110 |
| 6,226,141 B1 | 5/2001 | Teterud | |
| 6,246,533 B1 * | 6/2001 | Davis et al. | 360/68 |
| 6,512,646 B1 * | 1/2003 | Leighton et al. | 360/46 |
| 6,614,273 B2 | 9/2003 | Teterud et al. | |
| 6,697,205 B2 * | 2/2004 | Cyrusian et al. | 360/68 |
| 6,856,195 B2 * | 2/2005 | Ranmuthu | 330/86 |
| 6,879,455 B2 | 4/2005 | Ngo et al. | |
| 6,927,933 B2 * | 8/2005 | Choi et al. | 360/68 |

* cited by examiner

*Primary Examiner*—William J. Klimowicz
*Assistant Examiner*—Daniell L Negrón (57) ABSTRACT

Embodiments of the present invention relate to an impedance-matched write driver circuit which comprises a voltage source, a write driver circuit electrically coupled to the voltage source, a signal input coupled so as to effect the output of the write driver circuit, and an impedance matching circuit electrically coupled to the write driver circuit, wherein the impedance matching circuit is enabled to damp the output oscillations in the output of the write driver circuit. Importantly, the impedance of the impedance-matched write driver circuit is selectable by component selection or by logic. Another embodiment of the present invention is directed to a system, e.g., a magnetic disk storage unit that makes use of the write driver as described herein.

15 Claims, 8 Drawing Sheets

IMPEDANCE-MATCHED WRITE DRIVER CIRCUIT AND SYSTEM USING SAME

This application is related to and claims priority to and is a divisional patent application of U.S. Pat. No. 10/404,531 entitled "Impedance-Matched Write Driver Circuit And System Using Same," by Takeuchi, filed on Mar. 31, 2003, now abandoned which is incorporated herein by reference.

RELATED U.S. APPLICATIONS

This application claims priority to the commonly-owned co-pending provisional patent application, U.S. Ser. No. 60/434,868, entitled "IMPEDANCE-MATCHED WRITE DRIVER," filed Dec. 19, 2002, and assigned to the assignee of the present invention and this application is hereby incorporated by reference.

FIELD OF THE INVENTION

The present invention relates to the field of hard disk memory storage devices.

BACKGROUND OF THE INVENTION

Magnetic hard disk drives continue to provide ever more storage space and faster access, as well as data transfer and retrieval times. Where once 100 kilobytes of stored data occupied a ten inch diameter footprint, 2.5 inch diameter disks now exceed 100 Gigabytes and information transfer and access times have undergone similar order-of-magnitude improvements.

One of the reasons for the continuing improvement is higher disk rotation speeds. Another reason is the continuing shrinkage of the size of a data bit recordable on the magnetic medium that coats the surface of a typical hard disk platter. The shrinking data bit footprint can be attributed to the ability to accurately position the reading and writing head close to the recording medium. The closer the head, the smaller the magnetic signal needed to define a recorded bit.

While there are mechanical and aerodynamic achievements behind the ability to get the read/write head to within microns of a recording surface, the electrical challenges have been no less daunting. Very precise control of write currents, for example, is necessary to write (record) a bit of uniform size to the medium. The uniform size of a bit is necessary in order to fit the highest possible number of bits onto a given platter surface size.

Access times, the time required to find a particular set of data bytes on the recorded surface, depend on the speed of disk rotation and on the speed with which the read/write head, mounted on the head arm, can be moved to a particular track on the platter. That head motion is easiest to attain with the lightest possible head and arm weights.

Figure 1A:
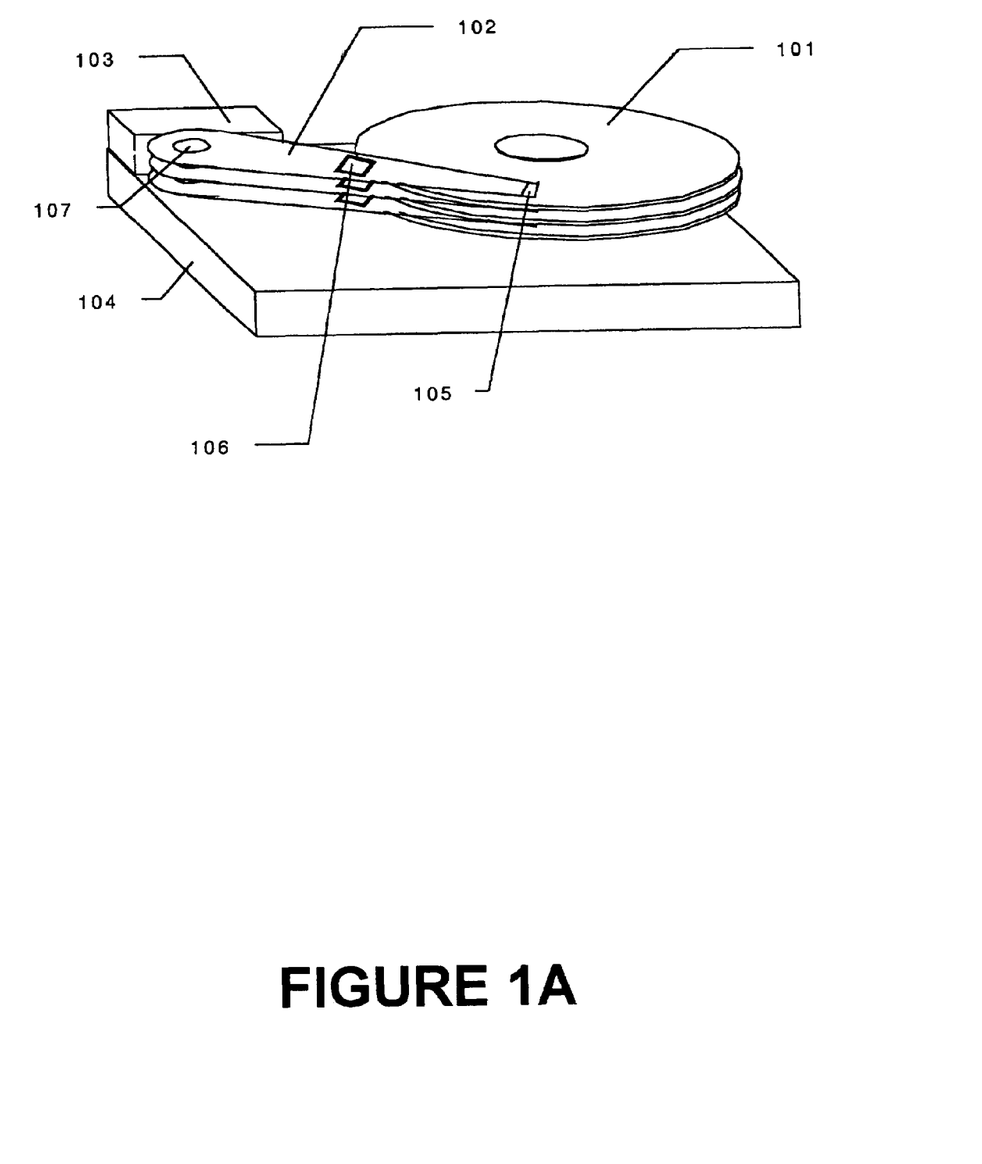
FIG. 1A (Conventional Art) illustrates a typical hard disk drive.

Conventional art FIG. 1A illustrates a typical hard disk drive. The recordable medium is coated on the surface of platters 101 where head arm 102 controls the position of read/write head 105. Read/write head 105 records and reads data written to the recordable medium. Write current, sufficient to magnetize the appropriate bit of recordable medium, is sent to the head from pre-amp/write driver 106. The position of head arm 102 is driven by arm actuator 103 under control logic from logic board 104. It is noted here that there are many existing configurations of hard disk drives with varying numbers of platters on a common spindle and an accompanying number of head arms, one for each recordable medium surface. It is also noted that, as the numbers of platters increases, the numbers of arms also increases, and the inertial load on the moving arm actuator increases.

Transfer time, the time required to read or write a given amount of data, depends on many elements, of which disk rotation speed is a significant part. Another significant contributor to transfer time in data writing is the speed with which write current to the write head can be switched on and off.

While higher power electronics in the head arm and read/write head can contribute to higher rates of data writing, higher powers typically entail larger and heavier components. A larger and heavier pre-amp/write driver (106 in FIG. 1) of which there is one for each head on each arm, would force an increase in the inertia of head arms 102, necessarily slowing access times.

It is noted here that write driver 106 is, in this illustration, mounted on head arm 102. The mounting location of Write driver 106 is the result of tradeoffs made in the design process. The farther the write driver is located from the write head, the more effect the impedance of the wires connecting the two will have on the write signal, thereby reducing its operational frequency. In general, shorter wires result in theoretically faster signals. However, the mass of the pre-amp/write driver contributes to the moment of inertia of the head arm. Generally, locating the pre-amp/write driver closer to the write head means locating it farther from the arm spindle 107 and vice versa. With more mass located farther from the spindle, the stronger, and heavier, the arm must be. The heavier the arm and the farther the pre-amp/write driver is from the arm spindle 107, or the heavier the pre-amp/write driver, the more the actuator energy required to move the arm from disk track to disk track rapidly and the higher demand on the arm actuator for precision control of the head arm.

Figure 1B:
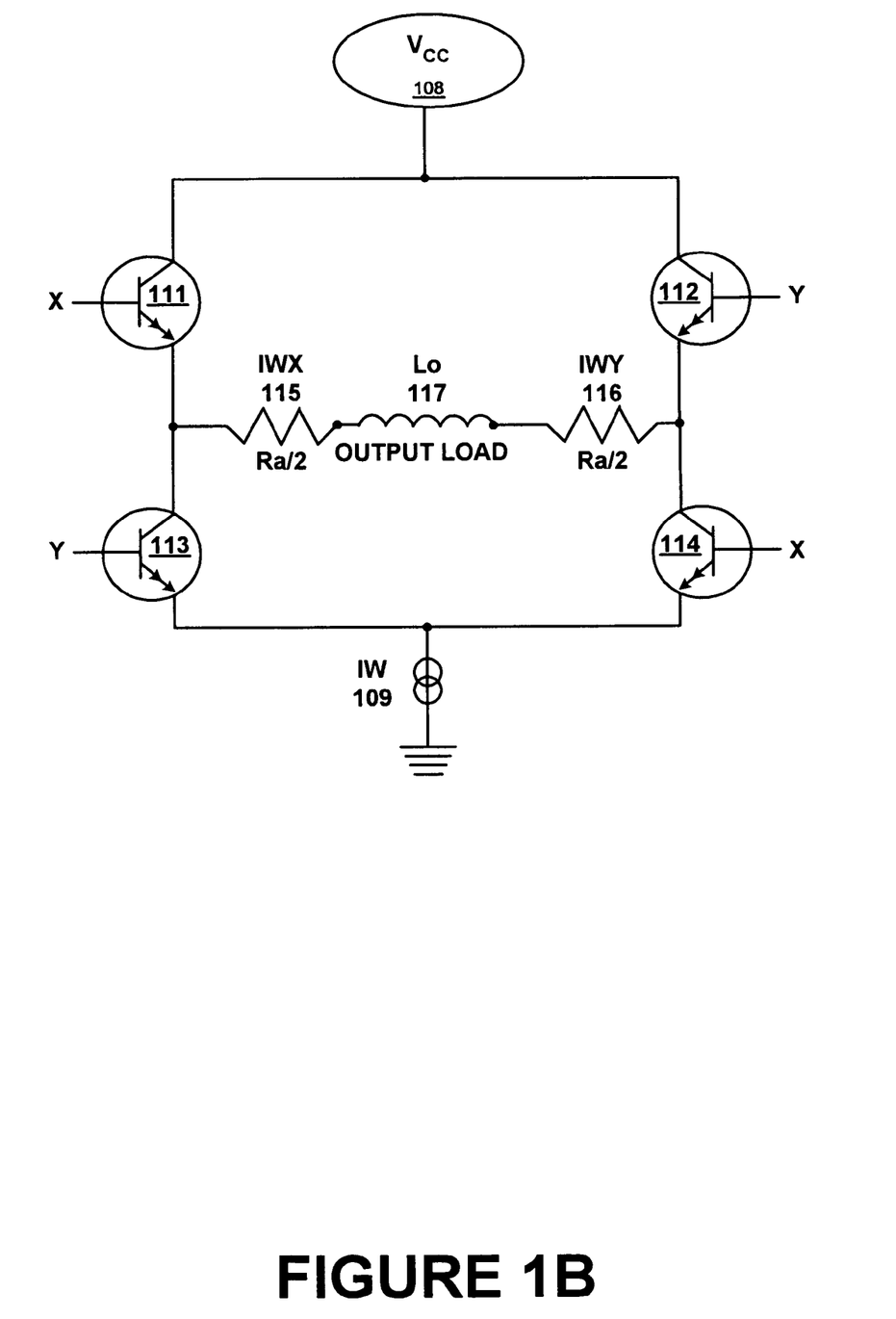
FIG. 1B (Conventional Art) illustrates a typical hard disk drive write driver circuit.

Conventional art FIG. 1B illustrates a write driver circuit, in this case an "H-bridge" model of a typical write driver. An "X" logic signal or a "Y" logic signal, representing logic level commands for a logical "1" or "0" in the recorded medium, are sent to the driver from upstream logic. Amplifying transistors 111, 112, 113 and 114 are switched on or off as appropriate to control power supply voltage Vcc, 108, in the appropriate direction through the write head, represented in FIG. 1B by load resistances 115 and 116 and also load inductance 117. It is noted that the output load is approximated in this illustration. There are any number of different load models associated with existing write heads.

As demand for speed of writing to the recordable medium seeks ever faster write speeds, impedance in write drivers, connecting wires and in write heads limits switch-on, switch-off rates. A mismatch of impedances between the write driver and the write head, and associated wiring, often results in signal reflections and jitter which slows the attainment of the proper signal level to the write head. The proper write signal level is necessary to achieve a subsequently readable written bit that is also contained fully within the allowable bit footprint in the recorded medium.

Impedance mismatches occur because, when the one of the bottom transistors in the H-bridge, illustrated in FIG. 1B, is turned on by the appropriate logic input, the output impedance of the transistor becomes high and the signal is reflected at the output terminal. The output current thus has a large overshoot and ringing, or oscillation, and the overshoot and ringing, as discussed above, decrease the achievable data rate.

In order to match impedances as well as possible, drive designers choose from a selection of available pre-amp/write drivers, trading off between signal speed and quality and pre-amp/write driver location on the head arm. The design process can be iterative and slow and can result in compromises in component selection that result in non-optimum hard disk drive performance. Furthermore, maintaining a selection of components in order to accommodate differences between designs can be costly to the drive manufacturer.

SUMMARY OF THE INVENTION

Accordingly, an impedance matching write driver circuit and system for use are presented herein. Embodiments of the present invention provide a circuit that can enable the hard disk designer to select the proper impedance to match the characteristics of the write head in order to reduce reflections and ringing in the write current output by the write driver.

Embodiments of the present invention relate to an impedance-matched write driver circuit which comprises a voltage source, a write driver circuit electrically coupled to the voltage source, a signal input coupled so as to effect the output of the write driver circuit, and an impedance matching circuit electrically coupled to the write driver circuit, wherein the impedance matching circuit is enabled to damp the output oscillations in the output of the write driver circuit. Importantly, the impedance of the impedance-matched write driver circuit is selectable by component selection or by logic. Another embodiment of the present invention is directed to a system, e.g., a magnetic disk storage unit that makes use of the write driver as described herein.

These and other objects and advantages of the present invention will become obvious to those of ordinary skill in the art after having read the following detailed description of the preferred embodiments which are illustrated in the various drawing figures.

BRIEF DESCRIPTION OF THE DRAWING

The operation and components of this invention can be best visualized by reference to the drawing.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention. Features and aspects of embodiments of the present invention may be more easily learned by reference to the attached figures.

Figure 2:
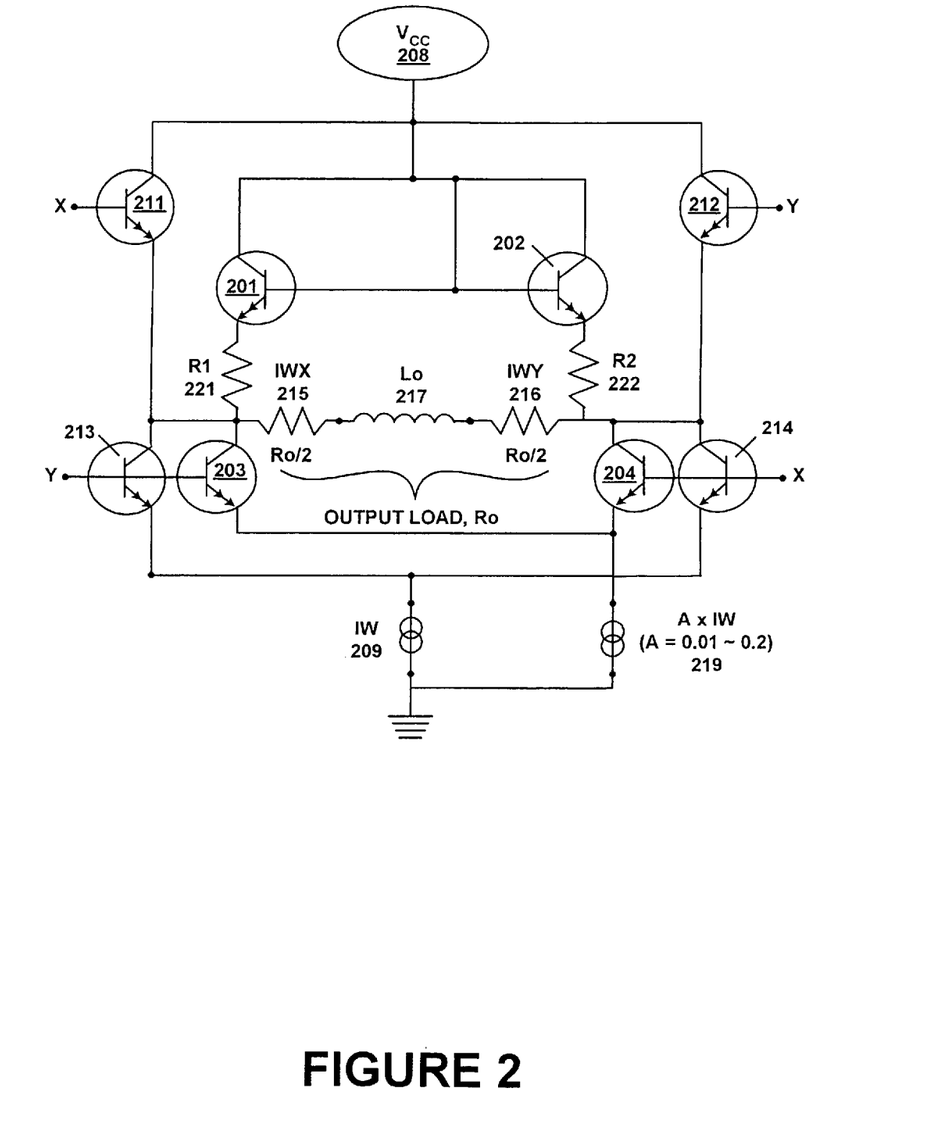
FIG. 2 illustrates an impedance matching circuit in accordance with embodiments of the present invention.

FIG. 2 illustrates an impedance-matched write driver circuit in accordance with one embodiment of the present invention. In FIG. 2, voltage source 208 supplies voltage to current driver transistors 211, 212, 213 and 214 which control direction of current through the output load, modeled by resistances 215 and 216 and inductance 217. It is noted here that the output load is a function of the magnetic read head being driven by the write driver as well as the magnetic recording medium being written to. Voltage source 208 also provides voltage to an impedance matching circuit here illustrated by transistors 201, 202, 203 and 204. Voltage source 208 is connected to the base connections of transistors 201 and 202 as well as their collector connections.

The emitter connections of transistors 201 and 202 are connected, in this embodiment, through resistors 221 and 222, to the output load. Transistors 203 and 204 are collector connected to the output load and their base connections are connected to an "X" and a "Y" input, respectively, the same inputs are connected to the base connections of current driver transistors 213 and 214. The emitter connections of transistors 203 and 204 are connected to ground through band gap reference 219. It is noted here that "X" and "Y" inputs, as used in this illustration, are meant to refer to the points where logical "0" and logical "1" inputs are input. The logical "0" and logical "1" inputs are the relative high and low voltages of digital signals. In this embodiment of the present invention, "X" and "Y" are the input of the digital logical signal that controls what is written to the magnetic recording medium of the storage device.

The bridge constructed from transistors 201, 202, 203 and 204 forms an impedance matching circuit. Excessive signal reflection and ringing are the result of mismatched impedance between the write driver and the load. In order to reduce the effects of mismatched impedance during the period when the current driving transistors in the H-bridge, 211 and 214 or 212 and 213, are turned on, the output impedance matching circuit drives the impedance to less than 100 ohms. This embodiment of the present invention employs one technique for accomplishing this but it is noted that there are other techniques employed by other embodiments.

When the signal input to X is high and the signal input to Y is low, transistor 211 and transistor 214 are turned on. The write current flows from $IW_x$ to $IW_y$. Transistor 204 is also turned on. The output impedance, Ro, is given in this embodiment of the present invention by the relationship:

$$Ro = (R2 + 1/\text{gm}(Q9)),$$

where R2 refers to resistance 222 in FIG. 2 and where 1/gm (Q9) refers to the instantaneous transconductance of transistor 202.

Figure 3:
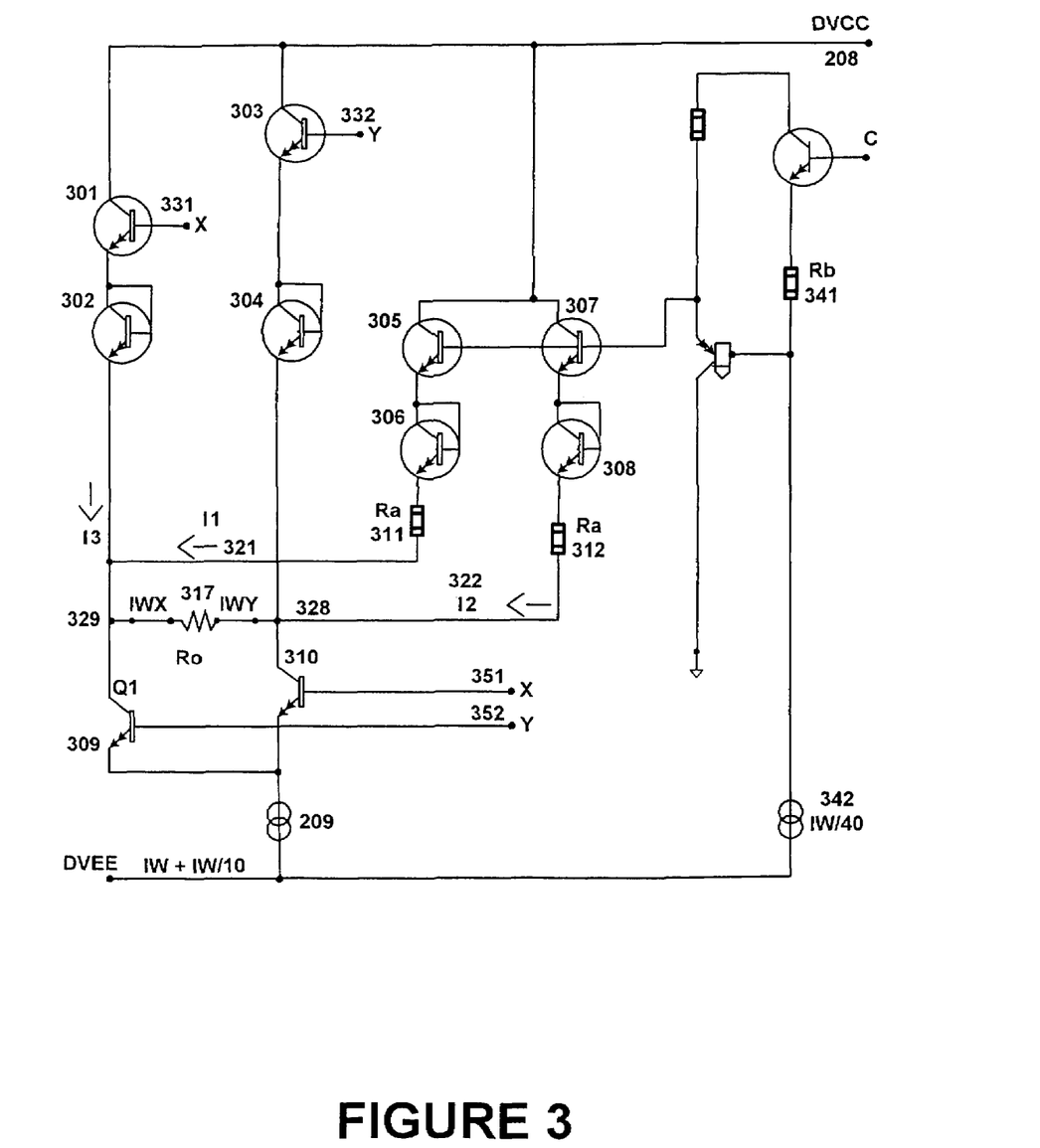
FIG. 3 illustrates an exemplary write driver impedance matching circuit in accordance with embodiments of the present invention.

An illustration of another embodiment of the present invention is found in FIG. 3. Here, impedance matching is achieved by the cascading of transistors 301 and 302, 303 and 304, 305 and 306, and 307 and 308. Here, too, the "H-bridge" write driver comprises cascaded transistors 301 and 302, and 303 and 304, with transistors 309 and 310. $IW_x$, the write current for "X", is supplied when the X inputs, 331 and 351, are high, turning on cascaded transistors 301 and 302, as well as transistor 310. $IW_y$, the write current for "Y" is supplied when "Y" inputs, 332 and 352, are high, turning on cascaded transistors 303 and 304 and transistor 309.

In the embodiment illustrated in FIG. 3, impedance matching is accomplished in the damping current circuit implemented with transistors 305 through 308 in conjunction with resistors 311 and 312. When the write signal is high at "X", 331 and 351, $IW_X$ is damped by damping current I2, at 322. When the write signal is high at "Y", 331 and 352, $IW_Y$ is damped by damping current I1, at 321.

In order to maintain precise control over the recorded data bit footprint, the write driver maintains write current (Iw) accuracy within the desired current range of the write head in its application. Damping circuit current I2, at 321, is given by:

$$I2=\{1.1Ro/Ra-Rb/(40Ra)\}Iw/(1+Ro/Ra)(=D_cIw). \quad (1)$$

Where:
$D_c$: damping current coefficient=$\{1.1\ Ro/Ra-Rb/(40Ra)\}Iw/(1+Ro/Ra)$
Ro: output load
Ra: damping resistor
Rb: bias resistor
Iw: reference current times 40 (write current)

In the circuit illustrated in this implementation, Rb refers to the resistance of resistor 341, and Ra refers to the resistance of damping resistors 311 and 312. The damping coefficient, $D_c$ is set, in this implementation, to 0.1. The actual write current, $IW_X$ or $IW_Y$, is equal to the Iw, which is the reference current, times 40.

The voltage drop from point 331 to point 328 is, in this embodiment, equal to the voltage drop from point "C" to point 328 as shown in the following relationships.

$$Vbe(301)+Vbe(302)+(I1+I3)Ro=Vbe(333)+Iw\,Rb/40-Vbe(339)+Vbe(307)+Vbe(308)+Ra\,I2 \quad (2)$$

Assuming Vbe(301)=Vbe(307), Vbe(302)=Vbe(308) (because I2 is around 0.1 I3), and Vbe(333)=Vbe(339).

Then relationship (2) is written in the form:

$$(I3+I1)Ro=Iw\,Rb/40+Ra\,I2 \quad (3)$$

From the Kirhhoff's current law at point 328, $$1.1Iw=I1+I2+I3 \quad (4)$$

Relationship (4) is written in the form:

$$I1+I3=1.1Iw-I2 \quad (5)$$

Combining relationships (3) and (5) leads to:

$$I2=\{1.1Ro/Ra-Rb/(40Ra)\}Iw/(1+Ro/Ra) \quad (1)$$

The voltage drop from point 331 to point 329 is equal to the voltage drop from point "C" to point 329

$$Vbe(Q3)+Vbe(Q2)=Vbe(Q33)+Iw\,Rb/40-Vbe(P9)+Vbe(Q22)+Vbe(Q21)+Ra\,I1 \quad (6)$$

The effective size of the impedance matching transistors, in this illustration is determined by the transistor size ratio which is, in this embodiment:

$$Q3,301{:}Q22,305=Q2,302{:}Q21,306=10{:}1.$$

Assuming Vbe(333)=Vbe(339), relationship (6) thus is written in the form:

$$I1=2Vt\{1n(I3/10I1)\}/Ra-Iw\,Rb/40Ra \quad (7)$$

It is noted that one possible requirement for write driver/preamplifiers is a write speed on the order of 800 Mbps (million bits per second). It is also noted that a desirable feature of a write driver is a favorable power supply rejection ration (PSRR). Embodiments of the present invention achieve both of these attributes.

Figure 4:
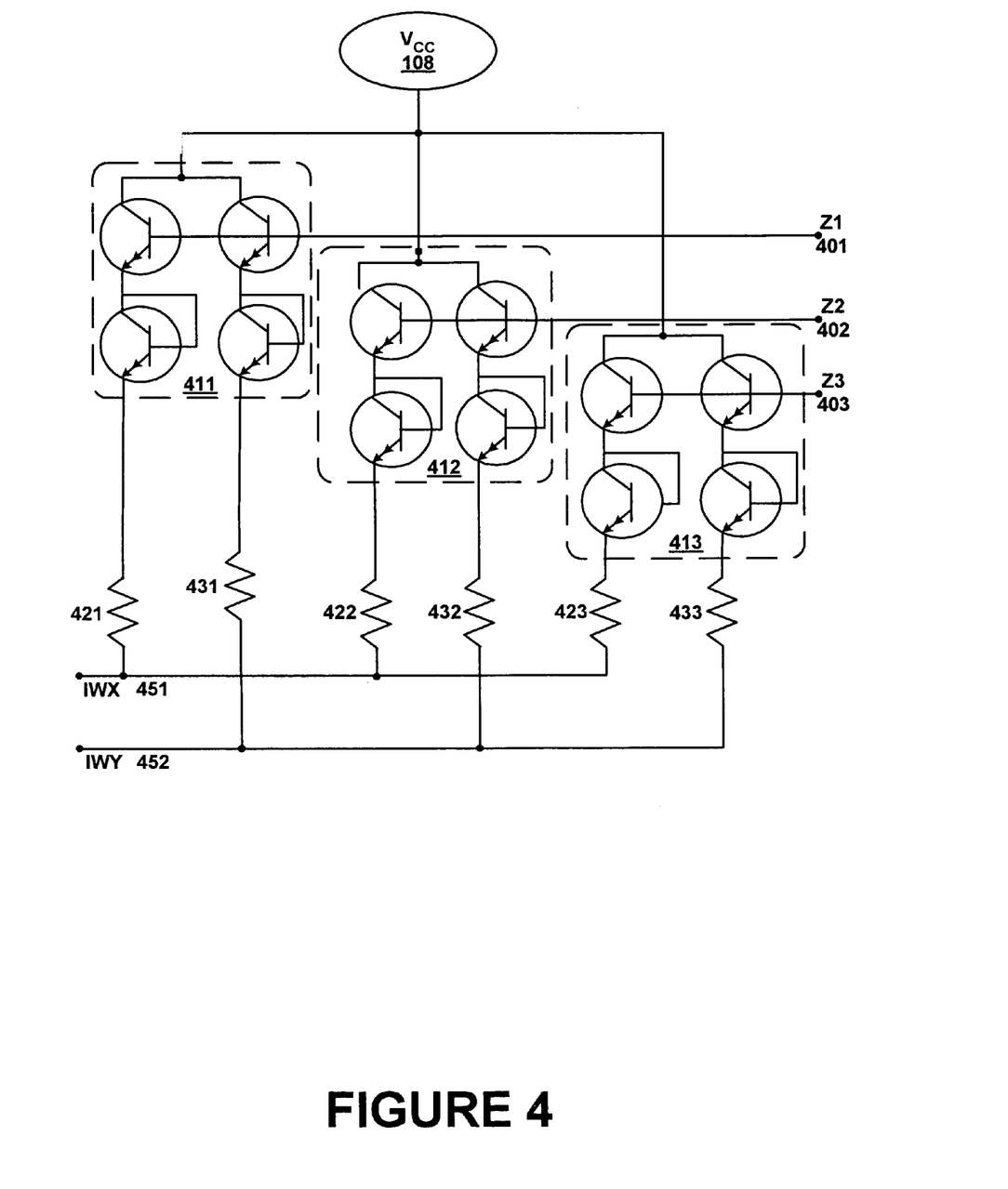
FIG. 4 illustrates a selectable impedance matching circuit in accordance with embodiments of the present invention.

FIG. 4 illustrates a circuit implementation of an impedance matching circuit to dampen an output for a write driver such as illustrated in FIG. 3. In this illustration, there are shown three different impedance matching circuits which are selectable based on the signal levels of impedance control inputs $Z_1$ at 401, $Z_2$ at 402 and $Z_3$ at 403. Impedance matching circuits 411, 412 and 413 provide the same impedance balancing and signal damping as the impedance matching circuit illustrated in FIG. 3. It is noted here that the four transistors illustrated in each impedance matching circuit corresponds and is analogous to transistors 305, 306, 307 and 308 in FIG. 3. However, selection of resistance values for resistors 421, 422, 423, 431, 432 and 433 result in different impedance values for each of the impedance matching circuits. It is noted that, by designing an appropriate value for the resistors in manufacture of the semiconductor device which comprises some embodiments of the present invention, the same semiconductor device can be employed in a wide variety of hard disk drives. The resultant advantages of this can be a reduced parts inventory and a speedier design process.

In FIG. 4, input $Z_1$, 401, selects impedance matching circuit 411; $Z_2$, 402, selects impedance matching circuit 412; and $Z_3$, 403, selects impedance matching circuit 413. As discussed above, resistor value selection determines the actual impedance balance of each circuit. However, in the embodiment of the present invention discussed here, values are chosen which result in available impedances of 50 ohms, 74 ohms, and 100 ohms. The balancing impedance is provided at IWX, 451, and IWY, 452, which correspond with points 329 and 328, respectively, in FIG. 3.

Figure 5:
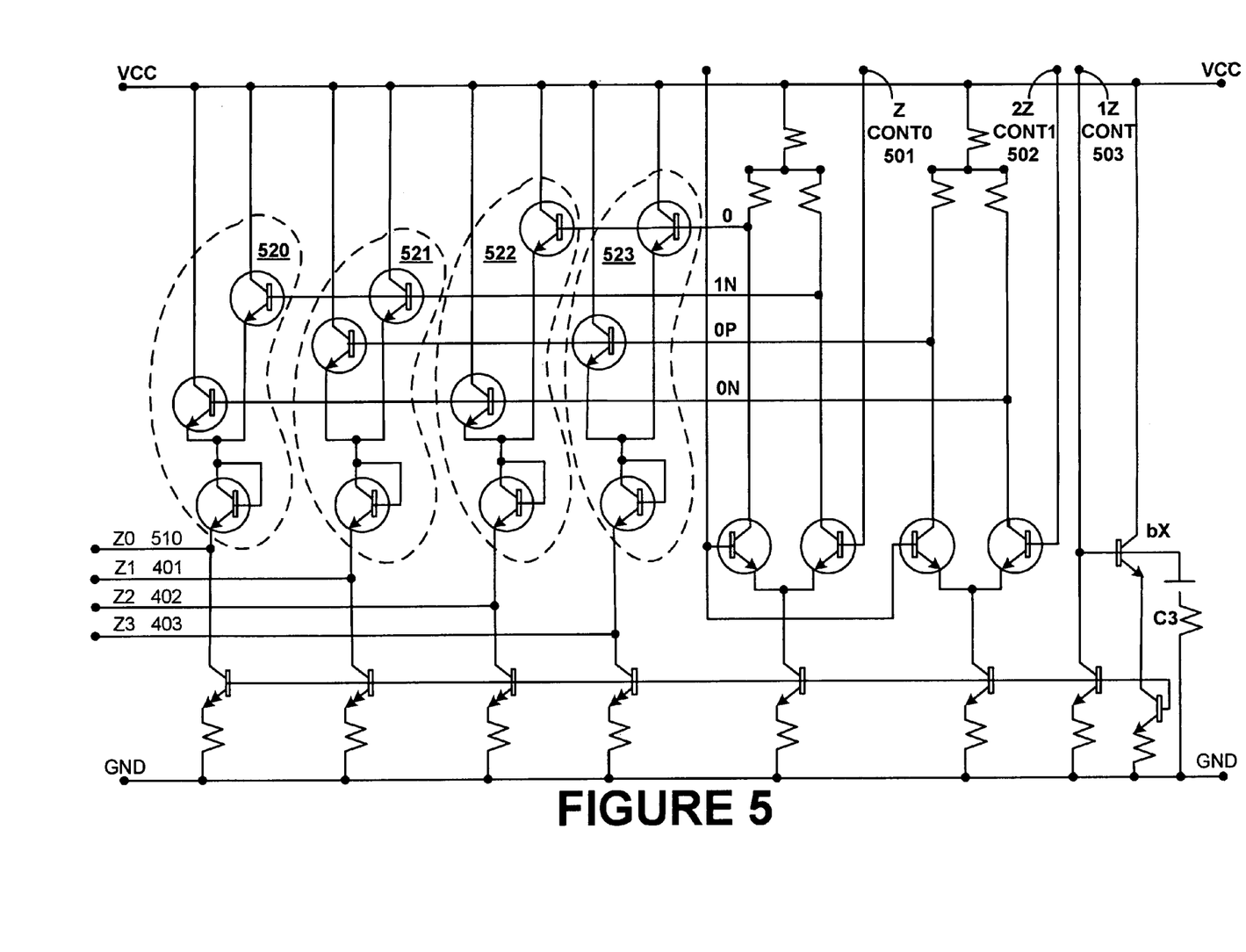
FIG. 5 illustrates an exemplary impedance selection circuit in accordance with embodiments of the present invention.

FIG. 5 illustrates an implementation of an impedance selection circuit in accordance with an embodiment of the present invention. The illustration here can either be of a portion of the semiconductor device which comprises the write driver or it may be of a discrete component of the write driver system. Impedance control bit "0" (ZCONT0), 501, and impedance control bit "1" (ZCONT1), 502, are, in this embodiment, the controlling inputs which control the matching impedance discussed above.

By selection of a high signal on both ZCONT0 and ZCONT1, a high on one and a low on the other, or a low signal on both, four impedance levels can be selected: $Z_0$ at 510, $Z_1$ at 401, $Z_2$ at 402 and $Z_3$ at 403. It is noted that $Z_1$, $Z_2$ and $Z_3$ are the same impedance selection inputs as shown in FIG. 4. In this embodiment, the selectable impedances are open (zero), 50 ohms, 74 ohms and 100 ohms.

Impedance selection, in this embodiment, is made by switching on or off selections circuits 520 through 523. Each circuit is identical and serve to implement the "two to four" translation required to make the selection with two available input bits. It is noted that impedances can be selected by component selection in manufacture that results in the desired ZCONT0 and ZCONT1 states, or can be selected by logic in implementations where the desired impedance matching changes within a manufactured hard disk device.

In the embodiment of the present invention discussed herein, there are four selectable impedances The following table illustrates the balancing impedances to a write driver that result from the input states of ZCONT0 and ZCONT1.

| ZCONT0 | ZCONT1 | Output |
|---|---|---|
| H | H | $Z_0$, Open |
| H | L | $Z_1$, 100 ohms |

-continued

| ZCONT0 | ZCONT1 | Output |
|--------|--------|--------|
| L | H | $Z_2$, 74 ohms |
| L | L | $Z_3$, 50 ohms |

Figure 6:
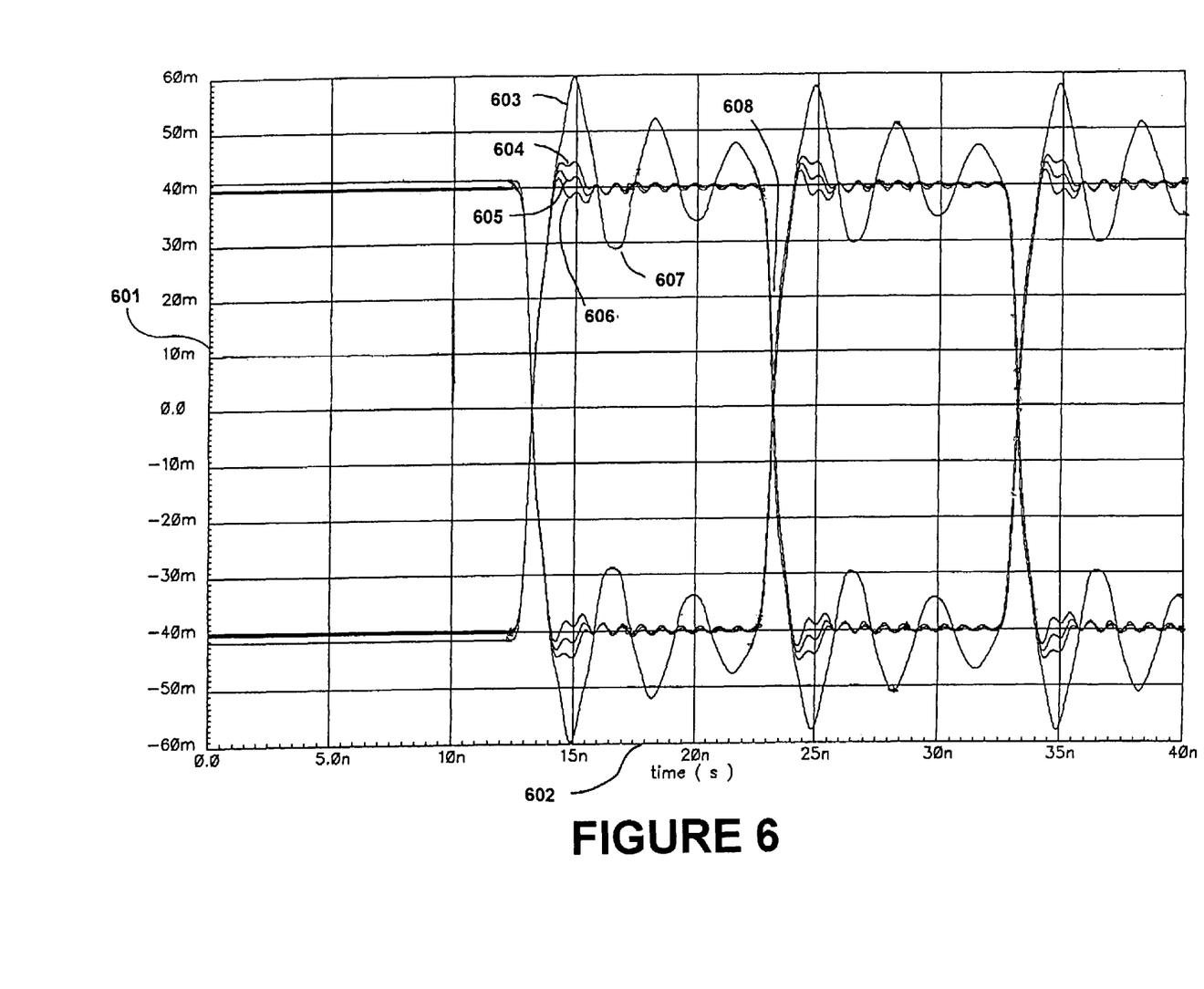
FIG. 6 illustrates an exemplary write driver signal performance curve in accordance with embodiments of the present invention.

FIG. 6 illustrates a modeled resultant output of a write driver employing embodiments of the present invention. FIG. 6 is a graph in which ordinate 601 measures current in amps and abscissa 602 is time measured in nanoseconds. The write head model used to generate the performance curves illustrated is a typical resistance/inductance (RL) write head circuit. Output signal 603 illustrates the behavior of a write driver without impedance matching. It is noted that initial pulse onset is seeking a signal strength of 40 mA for a period of approximately ten nanoseconds. It is noted that an overshoot to a higher signal strength can result in an adverse performance of the write head. Here signal curve 603 initially overshoots to 60 mA then undershoots by ten mA, 607, taking nearly the entire pulse period to recover and never fully damping out at the desired signal strength. This undamped performance repeats with every change of write signal, such as at 608.

Curve 604 illustrates the performance of a write driver incorporating an embodiment of the present invention. The impedance matching balances the write driver output with an impedance of 100 ohms. With the same signal input as was used for curve 603, curve 604 overshoots by a smaller amount, in this illustration four mA, and damps to within two mA within two nanoseconds. Curves 605 and 606 illustrate the output signal behavior of the impedance-matched write driver with a balancing impedance of 74 ohms and 50 ohms, respectively.

It is noted that the modeled curves presented in FIG. 6 are only for illustration and embodiments of the present invention provide different behaviors in different applications. In each case, however, the addition of impedance matching results in a much improved write head performance with a smaller signal overshoot and a shortened damping time to desired signal strength. These combine to provide more rapid and more accurate data bit writing to the recordable medium of the hard disk device.

A typical application for a hard disk employing an embodiment of the present invention is in a computer system. A configuration typical to a generic computer system is illustrated, in block diagram form, in FIG. 7. Generic computer 700 is characterized by a processor 701, connected electronically by a bus 750 to a volatile memory 702, a non-volatile memory 703, possibly some form of data storage device 704 and a display device 705. It is noted that display device 705 can be implemented in different forms. While a video CRT or LCD screen is common, this embodiment can be implemented with other devices or possibly none. Bus 710 also connects a possible alpha-numeric input device 706, cursor control 707, and communication I/O device 708. An alpha-numeric input device 706 may be implemented as any number of possible devices, but is commonly implemented as a keyboard.

Figure 7:
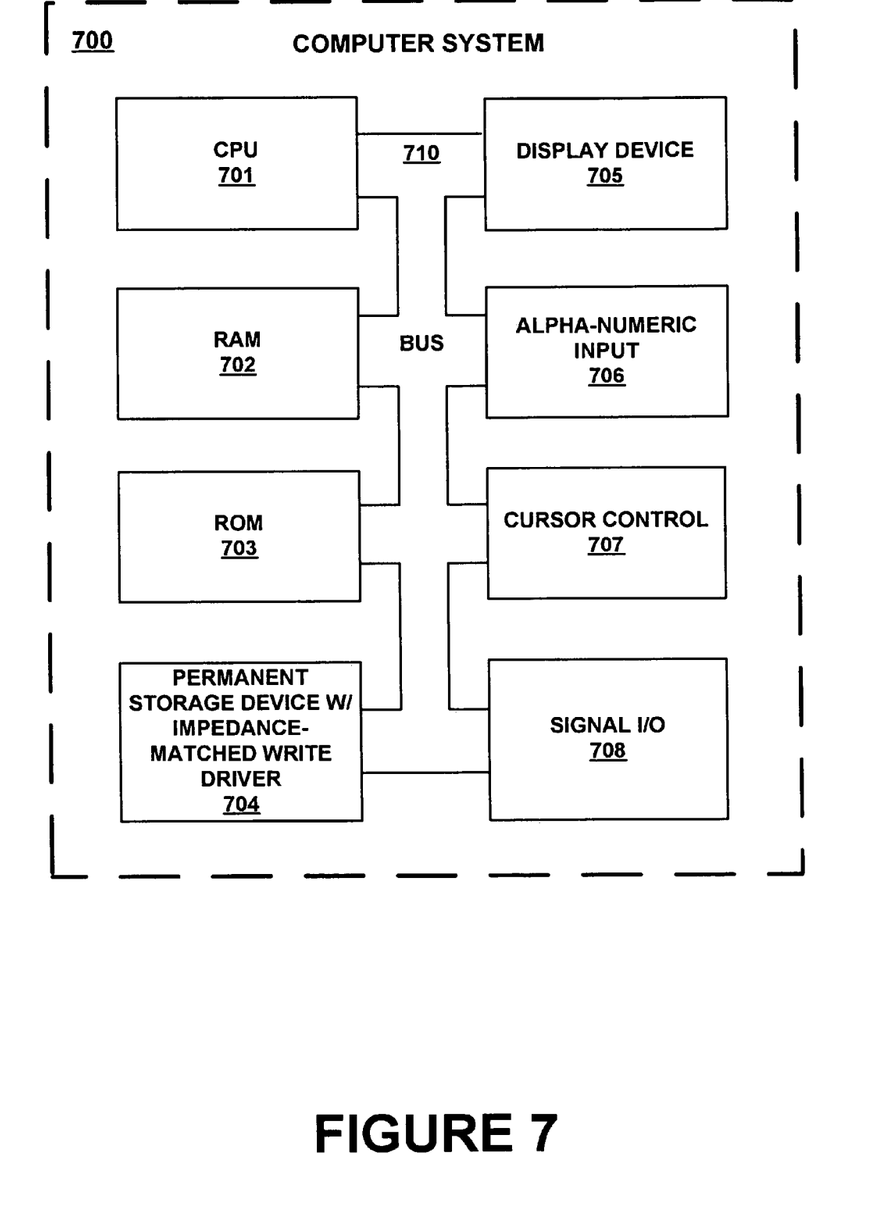
FIG. 7 illustrates a computer system incorporating an embodiment of the present invention.

It is noted here that permanent data storage device 704 is, in implementations pertinent to embodiments of the present invention, a hard disk memory device employing an impedance-matched write driver. However, embodiments of the present invention can operate in systems such as autonomous servers, dedicated MP3 players and other stand alone systems, obviating the need for a directly connected display device and for an alpha-numeric input device. Similarly, the employment of cursor control 707 is predicated on the use of a graphic display device, 705.

A novel impedance-matched write driver has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A selectable impedance write driver circuit comprising:
   a plurality of current driver circuits for adjusting an output impedance of a current output of said write driver circuit, wherein said plurality of current driver circuits are coupled to a voltage source, and wherein each of said plurality of current driver circuits is for coupling in series with an inductive load of a write head;
   a selection input coupled to said plurality of current driver circuits, wherein said selection input enables at least one of said plurality of current driver circuits; and
   wherein said write driver circuit adjusts said output impedance in response to an enabling of at least one of said plurality of current driver circuits.

2. The selectable impedance write driver circuit described in claim 1, wherein said enabling is responsive to a component selection external to said write driver circuit.

3. The selectable impedance write driver circuit described in claim 1, wherein said enabling is a result of logic input to said write driver circuit.

4. The selectable impedance write driver circuit described in claim 1, wherein said output impedance is a function of a resistance value of a resistor in an enabled current driver circuit of said plurality of current driver circuits.

5. The selectable impedance write driver circuit described in claim 1, wherein said plurality of current driver circuits supply a write current that writes digital information to a storage medium.

6. A selectable impedance write driver circuit comprising:
   a first and second transistor;
   a third transistor coupled in series with said first transistor, and a fourth transistor coupled in series with said second transistor;
   a first input coupled to said first transistor, wherein said first input is operable to enable current flow through said first and third transistors that provides a first output impedance for said write driver circuit; and
   a second input coupled to said second transistor, wherein said second input is operable to enable current flow through said second and fourth transistors that provides a second output impedance for said write driver circuit.

7. The selectable impedance write driver circuit described in claim 6, wherein at least one of said providing a first output impedance and providing a second output impedance is a result of a resistor selection external to said write driver circuit.

8. The selectable impedance write driver circuit described in claim 6, wherein at least one of said providing a first output impedance and providing a second output impedance is a result of logic input to said write driver circuit.

9. The selectable impedance write driver circuit described in claim 6 further comprising a plurality of resistors coupled with at least one of said third and fourth transistors, wherein at least one of said first and second output impedances is a function of a resistance value of said plurality of resistors.

10. The selectable impedance write driver circuit described in claim 6, wherein said first, second, third, and fourth transistors supply a write current that writes digital information to a storage medium.

11. A magnetic storage device comprising:
  a write head comprising:
    an inductive load; and
    a write driver circuit coupled to said inductive load, wherein said write driver circuit comprises:
      a plurality of current driver circuits that adjust an output impedance of a current output of said write driver circuit, wherein each of said plurality of current driver circuits is for coupling in series with said inductive load;
      a first input coupled to said plurality of current driver circuits, wherein said first input enables at least one of said plurality of current driver circuits; and
      wherein said write driver circuit adjusts said output impedance in response to an enabling of at least one of said plurality of current driver circuits;
  a read head; and
  a plurality of storage platters disposed to interface with said write head and said read head.

12. The magnetic storage device described in claim 11, wherein said enabling is responsive to a component selection external to said write driver circuit.

13. The magnetic storage device described in claim 11, wherein said enabling is a result of logic input to said write driver circuit.

14. The magnetic storage device described in claim 11, wherein said output impedance is a function of a resistance value of a resistor in an enabled current driver circuit of said plurality of current driver circuits.

15. The magnetic storage device described in claim 11, wherein said plurality of current driver circuits supply a write current that writes digital information to at least one of said plurality of storage platters.

* * * * *